United States Patent
Palmer, Jr. et al.

(10) Patent No.: US 9,441,314 B2
(45) Date of Patent: *Sep. 13, 2016

(54) SPANDEX FROM HIGH MOLECULAR WEIGHT POLY (TETRAMETHYLENE-CO-ETHYLENEETHER) GLYCOLS

(75) Inventors: Charles F. Palmer, Jr., Waynesboro, VA (US); James M. Lambert, Staunton, VA (US)

(73) Assignee: INVISTA North America S.a.r.l., Wilmington, DE (US)

(*) Notice: Subject to any disclaimer, the term of this patent is extended or adjusted under 35 U.S.C. 154(b) by 1587 days.

This patent is subject to a terminal disclaimer.

(21) Appl. No.: 11/429,850

(22) Filed: May 8, 2006

(65) Prior Publication Data

US 2007/0117951 A1    May 24, 2007

Related U.S. Application Data

(60) Provisional application No. 60/738,901, filed on Nov. 22, 2005, provisional application No. 60/738,684, filed on Nov. 22, 2005.

(51) Int. Cl.
| | |
|---|---|
| *D01F 6/70* | (2006.01) |
| *D01F 6/72* | (2006.01) |
| *D01F 6/78* | (2006.01) |
| *D01D 5/04* | (2006.01) |
| *C08G 18/28* | (2006.01) |
| *C08G 18/32* | (2006.01) |
| *C08G 18/48* | (2006.01) |
| *C08G 18/66* | (2006.01) |
| *C08G 18/10* | (2006.01) |

(52) U.S. Cl.
CPC ............ *D01F 6/70* (2013.01); *C08G 18/10* (2013.01); *C08G 18/2805* (2013.01); *C08G 18/2865* (2013.01); *C08G 18/3203* (2013.01); *C08G 18/324* (2013.01); *C08G 18/3228* (2013.01); *C08G 18/3231* (2013.01); *C08G 18/3234* (2013.01); *C08G 18/4837* (2013.01); *C08G 18/4854* (2013.01); *C08G 18/667* (2013.01); *C08G 18/6674* (2013.01); *C08G 18/6681* (2013.01); *D01D 5/04* (2013.01); *D01F 6/72* (2013.01); *D01F 6/78* (2013.01)

(58) Field of Classification Search
CPC ............ C08G 18/6681; C08G 18/324; C08G 18/667; C08G 18/6674; C08G 18/3234; C08G 18/3228; C08G 18/3231; C08G 18/3203; C08G 18/2805; C08G 18/4837; C08G 18/4854; C08G 18/2865; C08G 18/10; D01D 5/04; D01F 6/70; D01F 6/72; D01F 6/78
USPC ............... 528/61, 65, 68, 76, 906
See application file for complete search history.

(56) References Cited

U.S. PATENT DOCUMENTS

| | | | |
|---|---|---|---|
| 3,425,999 A | 2/1969 | Axelrod | |
| 4,120,850 A * | 10/1978 | Pechhold | 528/66 |
| 4,139,567 A | 2/1979 | Pruckmayr | |
| 4,153,786 A | 5/1979 | Pruckmayr | |
| 4,163,115 A | 7/1979 | Heinsohn | |
| 4,224,432 A | 9/1980 | Pechhold | |
| 4,383,100 A | 5/1983 | Pechhold et al. | |
| 4,568,775 A | 2/1986 | Aoshima | |
| 4,658,065 A | 4/1987 | Aoshima | |
| 5,162,387 A | 11/1992 | Abel et al. | |
| 5,340,902 A | 8/1994 | Smith et al. | |
| 5,879,799 A | 3/1999 | Yosizato et al. | |
| 5,905,133 A | 5/1999 | Muller et al. | |
| 6,020,451 A | 2/2000 | Fishback et al. | |
| 6,403,216 B1 | 6/2002 | Doi et al. | |
| 6,639,041 B2 | 10/2003 | Nishikawa | |
| 2002/0193550 A1 | 12/2002 | Nishikawa | |
| 2003/0166821 A1 | 9/2003 | Pruckmayr et al. | |
| 2004/0068080 A1* | 4/2004 | Liu et al. | 528/61 |
| 2004/0225101 A1* | 11/2004 | Selling et al. | 528/61 |

FOREIGN PATENT DOCUMENTS

| | | | |
|---|---|---|---|
| EP | 4356 | * | 10/1979 |
| EP | 371736 | * | 6/1990 |
| EP | 1236757 A1 | | 9/2002 |
| JP | 2001-098423 | | 4/2001 |
| JP | 2004-008324 | | 1/2004 |
| JP | 2004-215686 | | 8/2004 |
| JP | 2004-218096 | | 8/2004 |
| WO | WO2004/041891 A1 | | 5/2004 |
| WO | WO2004/041892 A1 | | 5/2004 |
| WO | WO2004/041893 A1 | | 5/2004 |
| WO | WO2004/042135 A1 | | 5/2004 |
| WO | WO2004/074341 A1 | | 9/2004 |
| WO | WO2004/074343 A1 | | 9/2004 |

OTHER PUBLICATIONS

Oertel; Polyurethane Handbook: Chemistry—Raw Materials—Processing—Applications—Properties; Hansen Publishers; New York; 1985; pp. 577-579.*
S. Siggia, "Quantitative Organic Analysis via Functional Group", 3rd Edition, Wiley & Sons, New York, pp. 559-561 (1963).
ASTM D 2731-72.
ASTM D 2515.
American Association of Textile Chemists and Colorists Test Method 61-1996, Colorfastness to Laundering, Home and Commercial: Accelerated . . . .

* cited by examiner

*Primary Examiner* — Rabon Sergent
(74) *Attorney, Agent, or Firm* — Bridget Sciamanna

(57) ABSTRACT

The invention provides polyurethaneurea compositions comprising poly(tetramethylene-co-ethyleneether) glycol having high number average molecular weight, from about 1900 to about 4000 Dalton. The invention further relates to the use of high number average molecular weight poly (tetramethylene-co-ethyleneether) glycol as the soft segment base material in spandex compositions. The invention also relates to new polyurethane compositions comprising poly (tetramethylene-co-ethyleneether) glycols with such high number average molecular weight, from about 1900 to about 4000 Dalton, and their use in spandex.

22 Claims, No Drawings

SPANDEX FROM HIGH MOLECULAR WEIGHT POLY (TETRAMETHYLENE-CO-ETHYLENEETHER) GLYCOLS

CROSS-REFERENCE TO RELATED APPLICATIONS

This application claims benefit of priority from Provisional Application No. 60/738,901, filed Nov. 22, 2005 and from Provisional Application No. 60/738,684, filed Nov. 22, 2005. This application hereby incorporates by reference Provisional Application No. 60/738,901 and Provisional Application No. 60/738,684 in their entireties. This application relates to commonly-assigned applications filed concurrently on May 8, 2006.

BACKGROUND OF THE INVENTION

1. Field of the Invention

This invention relates to new polyurethaneurea compositions comprising poly(tetramethylene-co-ethyleneether) glycols comprising constituent units derived by copolymerizing tetrahydrofuran and ethylene oxide, wherein the portion of the units derived from ethylene oxide is present in the poly(tetramethylene-co-ethyleneether) glycol from greater than about 37 to about 70 mole percent and the number average molecular weight is from about 1900 Dalton to about 4000 Dalton. The invention further relates to the use of poly(tetramethylene-co-ethyleneether) glycols having such high number average molecular weights as the soft segment base material in spandex compositions. The invention also relates to new polyurethane compositions comprising poly(tetramethylene-co-ethyleneether) glycols having such high number average molecular weight and their use in spandex.

2. Description of the Related Art

Poly(tetramethylene ether) glycols, also known as polytetrahydrofuran or homopolymers of tetrahydrofuran (THF, oxolane) are well known for their use in soft segments in polyurethaneureas. Poly(tetramethylene ether) glycols impart superior dynamic properties to polyurethaneurea elastomers and fibers. They possess very low glass transition temperatures, but have crystalline melt temperatures above room temperature. Thus, they are waxy solids at ambient temperatures and need to be kept at elevated temperatures to prevent solidification. As the molecular weight of poly (tetramethylene ether) glycols increase, their melt temperatures increase. The melting point of the glycol limits the molecular weight of the poly(tetramethylene ether) glycols that can be used to make spandex. As the melting point of the soft segment rises above ambient temperature, the set increases rapidly and the retractive power drops due to the increased crystallinity of the soft segment. Therefore the maximum molecular weight of poly(tetramethylene ether) glycols that can be used as a soft segment material is limited to that molecular weight that results in a melting point at or slightly above the use temperature of the spandex. In practice, the upper limit of poly(tetramethylene ether) glycols molecular weight useful in spandex is 1800 to 2000 Dalton, corresponding to a glycol melting point of about 26 to 30° C.

Copolymerization with a cyclic ether has been used to reduce the crystallinity of the polytetramethylene ether chains. This lowers the polymer melt temperature of the copolyether glycol and at the same time improves certain dynamic properties of the polyurethaneurea that contains such a copolymer as a soft segment. Among the comonomers used for this purpose is ethylene oxide, which can lower the copolymer melt temperature to below ambient, depending on the comonomer content. At ethyleneether contents above about 15 mole percent, the poly(tetramethylene-co-ethyleneether) glycols are moderately viscous liquids at room temperature. As the ethyleneether content increases above 15 mole percent, the melting point decreases further. Use of poly(tetramethylene-co-ethyleneether) glycols may also improve certain dynamic properties of polyurethaneureas, for example tenacity, elongation at break, and low temperature performance, which is desirable for some end uses.

Poly(tetramethylene-co-ethyleneether) glycols are known in the art. Their preparation is described in U.S. Pat. Nos. 4,139,567 and 4,153,786. Such copolymers can be prepared by any of the known methods of cyclic ether polymerization, such as those described in "Polytetrahydrofuran" by P. Dreyfuss (Gordon & Breach, N.Y. 1982), for example. Such polymerization methods include catalysis by strong proton or Lewis acids, heteropoly acids, and perfluorosulfonic acids or acid resins. In some instances it may be advantageous to use a polymerization promoter, such as a carboxylic acid anhydride, as described in U.S. Pat. No. 4,163,115. In these cases, the primary polymer products are diesters, which then need to be hydrolyzed in a subsequent step to obtain the desired polymeric glycols.

Poly(tetramethylene-co-ethyleneether) glycols offer advantages over poly(tetramethylene ether) glycols in terms of certain specific physical properties. At ethyleneether contents above 20 mole percent, the poly(tetramethylene-co-ethyleneether) glycols are moderately viscous liquids at room temperature and have a lower viscosity than poly (tetramethylene ether) glycols of the same molecular weight at temperatures above the melting point of poly(tetramethylene ether) glycols. Certain physical properties of the polyurethanes or polyurethaneureas prepared from poly(tetramethylene-co-ethyleneether) glycols surpass the properties of those polyurethanes or polyurethaneureas prepared from poly(tetramethylene ether) glycols.

Spandex based on poly(tetramethylene-co-ethyleneether) glycols is also known in the art. However, most of these are based on poly(tetramethylene-co-ethyleneether) containing co-extenders or extenders other than ethylene diamine. U.S. Pat. No. 4,224,432 to Pechhold et al. discloses the use of poly(tetramethylene-co-ethyleneether) glycols with low cyclic ether content to prepare spandex and other polyurethaneureas. Pechhold teaches that ethyleneether levels above 30 percent are preferred. Pechhold does not teach the use of coextenders, though it discloses that mixtures of amines may be used.

U.S. Pat. No. 4,658,065 to Aoshima et al. discloses the preparation of several THF copolyethers via the reaction of THF and polyhydric alcohols using heteropolyacid catalysts. Aoshima also discloses that copolymerizable cyclic ethers, such as ethylene oxide, may be included with the THF in the polymerization process. Aoshima discloses that the copolyether glycols may be used to prepare spandex, but contains no examples of spandex from poly(tetramethylene-co-ethyleneether) glycols.

U.S. Pat. No. 3,425,999 to Axelrood et al. discloses the preparation of polyether urethaneureas from poly(tetramethylene-co-ethyleneether) glycols for use in oil resistance and good low temperature performance. The poly(tetramethylene-co-ethyleneether) glycols have ethyleneether content ranging from 20 to 60 percent by weight (equivalent to 29 to 71 mole percent). Axelrood does not disclose the use of these urethaneureas in spandex. Axelrood discloses that "the chain extenders most useful in this invention are diamines selected from the group consisting of primary and secondary diamines and mixtures thereof." Axelrood further discloses that "the preferred diamines are hindered diamines, such as dichlorobenzidine and methylene bis(2-chloroaniline)." Use of ethylene diamine is not disclosed.

U.S. Pat. No. 6,639,041 to Nishikawa et al. discloses fibers having good elasticity at low temperature that contain polyurethaneureas prepared from polyols containing copolyethers of THF, ethylene oxide, and/or propylene oxide, diisocyanates, and diamines and polymers solvated in organic solvents. Nishikawa teaches that these compositions have improved low temperature performance over standard homopolymer spandexes. In addition, Nishikawa teaches that "the slight variation in copolyether glycol molecular weights is believed to have little effect on polyurethaneurea properties" in describing the data in Table III in which there is a 478 Dalton molecular weight difference between the examples.

The applicants have observed that spandex with high number average molecular weight glycols (i.e., from about 1900 Dalton to about 4000 Dalton) as the soft segment base material provides improved physical properties over spandex prepared from lower number average molecular weight ethyleneether-containing poly(tetramethylene-co-ethyleneether) glycols. The high number average molecular weight glycol-containing spandex of the present invention demonstrates lower set, load power, higher unload power, higher elongation, and higher circular knitting total draft than lower number average molecular weight ethyleneether spandex. Therefore, for several end uses a high molecular weight poly(tetramethylene-co-ethyleneether) glycol-containing spandex would be preferred over a lower molecular weight poly(tetramethylene-co-ethyleneether) glycol-containing spandex.

SUMMARY OF THE INVENTION

The present invention relates to spandex comprising a polyurethane or polyurethaneurea reaction product of: (a) a poly(tetramethylene-co-ethyleneether) glycol comprising constituent units derived by copolymerizing tetrahydrofuran and ethylene oxide wherein the portion of the units derived from ethylene oxide is present in the poly(tetramethylene-co-ethyleneether) glycol from greater than about 37 to about 70 mole percent and the number average molecular weight of said glycol is from about 1900 Dalton to about 4000 Dalton, (b) at least one diisocyanate, (c) at least one diamine chain extender or at least one diol chain extender having between about 0 and about 20 mole percent co-extenders, (c) and at least one chain terminator.

The present invention also relates to a process for preparing the above spandex comprising: (a) contacting a poly(tetramethylene-co-ethyleneether) glycol comprising constituent units derived by copolymerizing tetrahydrofuran and ethylene oxide wherein the portion of the units derived from ethylene oxide is present in the poly(tetramethylene-co-ethyleneether) glycol from greater than about 37 to about 70 mole percent and the number average molecular weight of said glycol is from about 1900 Dalton to about 4000 Dalton with at least one diisocyanate to form a capped glycol, (b) optionally adding a solvent to the product of (a), (c) contacting the product of (b) with at least one diamine or diol chain extender and at least one chain terminator, and (d) spinning the product of (c) to form spandex.

DETAILED DESCRIPTION OF THE INVENTION

The invention relates to new spandex compositions prepared from high molecular weight, i.e., between about 1900 Dalton and about 4000 Dalton, poly(tetramethylene-co-ethyleneether) glycols with ethyleneether content from greater than about 37 to about 70 mole percent, at least one diisocyanate, an ethylene diamine chain extender having from 0 to 20 mole percent coextenders, and at least one chain terminator such as diethylamine. Optionally, other diisocyanates, other chain extenders, and other chain terminators may be used. For the purposes of this application, high molecular weight poly(tetramethylene-co-ethyleneether) copolymers are defined as those from about 1900 Dalton to about 4000 Dalton.

The segmented polyurethanes or polyurethaneureas of this invention are made from a poly(tetramethylene-co-ethyleneether) glycol and, optionally, a polymeric glycol, at least one diisocyanate, and a difunctional chain extender. Poly(tetramethylene-co-ethyleneether) glycols are of value in forming the "soft segments" of the polyurethanes or polyurethaneureas used in making spandex. The poly(tetramethylene-co-ethyleneether) glycol or glycol mixture is first reacted with at least one diisocyanate to form an NCO-terminated prepolymer (a "capped glycol"), which is then dissolved in a suitable solvent, such as dimethylacetamide, dimethylformamide, or N-methylpyrrolidone, and then reacted with a difunctional chain extender. Polyurethanes are formed when the chain extenders are diols. Polyurethaneureas, a sub-class of polyurethanes, are formed when the chain extenders are diamines. In the preparation of a polyurethaneurea polymer which can be spun into spandex, the poly(tetramethylene-co-ethyleneether) glycol is extended by sequential reaction of the hydroxy end groups with diisocyanates and diamines. In each case, the poly (tetramethylene-co-ethyleneether) glycol must undergo chain extension to provide a polymer with the necessary properties, including viscosity. If desired, dibutyltin dilaurate, stannous octoate, mineral acids, tertiary amines such as triethylamine, N,N'-dimethylpiperazine, and the like, and other known catalysts can be used to assist in the capping step.

The poly(tetramethylene-co-ethyleneether) glycols used in making the polyurethanes or polyurethaneureas of the present invention can be made by the method disclosed in U.S. Pat. No. 4,139,567 to Pruckmayr using a solid perfluorosulfonic acid resin catalyst. Alternatively, any other acidic cyclic ether polymerization catalyst may be used to produce these poly(tetramethylene-co-ethyleneether) glycols, for example, heteropoly acids. The heteropoly acids and their salts useful in the practice of this invention can be, for example, those catalysts used in the polymerization and copolymerization of cyclic ethers as described in U.S. Pat. No. 4,658,065 to Aoshima et al. These polymerization methods may include the use of additional promoters, such as acetic anhydride, or may include the use of chain terminator molecules to regulate molecular weight.

The poly(tetramethylene-co-ethyleneether) glycols used in making the polyurethanes or polyurethaneureas of the present invention can comprise constituent units derived by copolymerizing tetrahydrofuran and ethylene oxide, wherein the percentage of ethylene ether moieties is from greater than about 37 to about 70 mole percent, for example from about 48 to about 58 mole percent. If the amount of ethyleneether in the poly(tetramethylene-co-ethyleneether) is maintained above about 37 mole percent, for example about 40 mole percent to about 70 mole percent, the physical properties, especially the load power, unload power and elongation of the spandex are improved over the lower percent ethyleneether spandex having the same or similar molecular weight. Therefore, for several end uses a high ethyleneether-content spandex would be preferred over a lower ethyleneether-content spandex. The percentage of units derived from ethylene oxide present in the glycol is equivalent to the percent of ethyleneether moieties present in the glycol.

Poly(tetramethylene-co-ethylene ether) glycols used in making the polyurethanes or polyurethaneureas of the present invention can have an average molecular weight of about 1900 Dalton to about 4000 Dalton, for example between about 2150 Dalton and about 4000 Dalton, or for example between about 2250 Dalton and about 4000 Dalton, or for example between about 1900 Dalton and about 3000 Dalton, or for example between about 2000 Dalton and about 3000 Dalton. Higher poly(tetramethylene-co-ethyleneether) glycol molecular weight can be advantageous for selected physical properties, such as elongation.

The poly(tetramethylene-co-ethyleneether) glycols used in making the polyurethanes or polyurethaneureas of the present invention can include small amounts of units derived from chain terminator diol molecules, especially non-cyclizing diols. Non-cyclizing diols are defined as di-alcohols that will not readily cyclize to form a cyclic ether under the reaction conditions. These non-cyclizing diols can include ethylene glycol, 1,2-propylene glycol, 1,3-propylene glycol, 1,4-butynediol, and water.

Poly(tetramethylene-co-ethyleneether) glycols which optionally comprise at least one additional component, such as for example 3-methyltetrahydrofuran, the ether derived from 1,3-propanediol, or other diols incorporated in small amounts as molecular weight control agents, can also be used in making the polyurethanes and polyurethaneureas of the present invention and are included in the meaning of the term "poly(tetramethylene-co-ethyleneether) or poly(tetramethylene-co-ethyleneether) glycol." The at least one additional component may be a comonomer of the polymeric glycol or it may be another material that is blended with the poly(tetramethylene-co-ethyleneether) glycol. The at least one additional component may be present to the extent that it does not detract from the beneficial aspects of the invention.

Diisocyanates that can be used include, but are not limited to, 1-isocyanato-4-[(4-isocyanatophenyl)methyl]benzene, 1-isocyanato-2-[(4-cyanatophenyl)methyl]benzene, bis(4-isocyanatocyclohexyl)methane, 5-isocyanato-1-(isocyanatomethyl)-1,3,3-trimethylcyclohexane, 1,3-diisocyanato-4-methyl-benzene, 2,2'-toluenediisocyanate, 2,4'-toluenediisocyanate, and mixtures thereof. The preferred diisocyanates are 1-isocyanato-4-[(4-isocyanatophenyl) methyl]benzene, 1-isocyanato-2-[(4-cyanatophenyl)methyl] benzene, and mixtures thereof. A particularly preferred diisocyanate is 1-isocyanato-4-[(4-isocyanatophenyl) methyl]benzene.

When a polyurethane is desired, the chain extender is a diol. Examples of such diols that may be used include, but are not limited to, ethylene glycol, 1,3-propanediol, 1,2-propylene glycol, 3-methyl-1,5-pentanediol, 2,2-dimethyl-1,3-trimethylene diol, 2,2,4-trimethyl-1,5-pentanediol, 2-methyl-2-ethyl-1,3-propanediol, 1,4-bis(hydroxyethoxy) benzene, 1,4-butanediol, and mixtures thereof. The diol chain extender may have between 0 and about 10 mole percent co-extenders.

When a polyurethaneurea is desired, the chain extender is a diamine. Examples of such diamines that may be used include, but are not limited to, hydrazine, ethylene diamine, 1,2-propanediamine, 1,3-propanediamine, 1,2-butanediamine (1,2-diaminobutane), 1,3-butanediamine (1,3-diaminobutane), 1,4-butanediamine (1,4-diaminobutane), 1,3-diamino-2,2-dimethylbutane, 4,4'-methylene-bis-cyclohexylamine, 1-amino-3,3,5-trimethyl-5-aminomethylcyclohexane, 1,6-hexanediamine, 2,2-dimethyl-1,3-diaminopropane, 2,4-diamino-1-methylcyclohexane, N-methylaminobis(3-propylamine), 2-methyl-1,5-pentanediamine, 1,5-diaminopentane, 1,4-cyclohexanediamine, 1,3-diamino-4-methylcyclohexane, 1,3-cyclohexane-diamine, 1,1-methylene-bis(4,4'-diaminohexane), 3-aminomethyl-3,5,5-trimethylcyclohexane, 1,3-pentanediamine (1,3-diaminopentane), m-xylylene diamine, and mixtures thereof. An ethylene diamine as an extender is preferred. An ethylene diamine as an extender may have between 0 and 10 mole percent co-extenders.

Optionally, a chain terminator, for example diethylamine, cyclohexylamine, n-hexylamine, or a monofunctional alcohol chain terminator such as butanol, can be used to control the molecular weight of the polymer. Additionally, a higher functional alcohol "chain brancher" such as pentaerythritol, or a trifunctional "chain brancher," such as diethylenetriamine, may be used to control solution viscosity.

The polyurethanes and polyurethaneureas of the present invention may be used in any application where polyurethanes or polyurethaneureas of this general type are employed, but are of special benefit in fabricating articles which, in use, require high elongation, low modulus, or good low temperature properties. They are of particular benefit in fabricating spandex, elastomers, flexible and rigid foams, coatings (both solvent and water-based), dispersions, films, adhesives, and shaped articles.

As used herein and unless otherwise indicated, the term "spandex" means a manufactured fiber in which the fiber-forming substance is a long chain synthetic polymer comprised of at least 85 percent by weight of a segmented polyurethane or polyurethaneureas. Spandex is also referred to as elastane.

The spandex of the present invention can be used to make knit and woven stretch fabrics, and garments or textile articles comprising such fabrics. Stretch fabric examples include circular, flat, and warp knits, and plain, twill, and satin wovens. The term "garment," as used herein, refers to an article of clothing such as a shirt, pants, skirt, jacket, coat, work shirt, work pants, uniform, outerwear, sportswear, swimsuit, bra, socks, and underwear, and also includes accessories such as belts, gloves, mittens, hats, hosiery, or footwear. The term "textile article," as used herein, refers to an article comprising fabric, such as a garment, and further includes such items as sheets, pillowcases, bedspreads, quilts, blankets, comforters, comforter covers, sleeping bags, shower curtains, curtains, drapes, tablecloths, napkins, wiping cloths, dish towels, and protective coverings for upholstery or furniture.

The spandex of the present invention can be used alone or in combination with various other fibers in wovens, weft (including flat and circular) knits, warp knits, and personal hygiene apparel such as diapers. The spandex can be bare, covered, or entangled with a companion fiber such as nylon, polyester, acetate, cotton, and the like.

Fabrics comprising the spandex of the present invention may also comprise at least one fiber selected from the group consisting of protein, cellulosic, and synthetic polymer fibers, or a combination of such members. As used herein, "protein fiber" means a fiber composed of protein, including such naturally occurring animal fibers as wool, silk, mohair, cashmere, alpaca, angora, vicuna, camel, and other hair and fur fibers. As used herein, "cellulosic fiber" means a fiber produced from tree or plant materials, including for example cotton, rayon, acetate, lyocell, linen, ramie, and other vegetable fibers. As used herein, "synthetic polymer fiber" means a manufactured fiber produced from a polymer built up from chemical elements or compounds, including for example polyester, polyamide, acrylic, spandex, polyolefin, and aramid.

An effective amount of a variety of additives can also be used in the spandex of the invention, provided they do not detract from the beneficial aspects of the invention. Examples include delustrants such as titanium dioxide and stabilizers such as hydrotalcite, a mixture of huntite and hydromagnesite, barium sulfate, hindered phenols, and zinc oxide, dyes and dye enhancers, antimicrobials, antitack agents, silicone oil, hindered amine light stabilizers, UV screeners, and the like.

The spandex of the present invention or the fabric comprising it may be dyed and printed by customary dyeing and printing procedures, such as from an aqueous dye liquor by the exhaust method at temperatures between 20° C. and 130° C., by padding the material comprising the spandex with dye liquors, or by spraying the material comprising the spandex with dye liquor.

Conventional methods may be followed when using an acid dye. For example, in an exhaust dyeing method, the fabric can be introduced into an aqueous dye bath having a pH of between 3 and 9 which is then heated steadily from a temperature of approximately 20° C. to a temperature in the range of 40 to 130° C. over the course of about 10 to 80 minutes. The dye bath and fabric are then held at temperature in the range of 40 to 130° C. for from 10 to 60 minutes before cooling. Unfixed dye is then rinsed from the fabric. Stretch and recovery properties of the spandex are best maintained by minimal exposure time at temperatures above 110° C. Conventional methods may also be followed when using a disperse dye.

As used herein, the term "washfastness" means the resistance of a dyed fabric to loss of color during home or commercial laundering. Lack of washfastness can result in color loss, sometimes referred to as color bleed, by an article that is not washfast. This can result in a color change in an article which is laundered together with the article that is not washfast. Consumers generally desire fabrics and yarns to exhibit washfastness. Washfastness relates to fiber composition, fabric dyeing and finishing processes, and laundering conditions. Spandex having improved washfastness is desired for today's apparel.

The washfastness properties of the spandex may be supported and further enhanced by use of customary auxiliary chemical additives. Anionic syntans may be used to improve the wetfastness characteristics, and can also be used as retarding and blocking agents when a minimal partition of dye is required between the spandex and partner yarn. Anionic sulfonated oil is an auxiliary additive used to retard anionic dyes from spandex or partner fibers that have a stronger affinity for the dye where uniform level dyeing is required. Cationic fixing agents can be used alone or in conjunction with anionic fixing agents to support improved washfastness.

Spandex fiber can be formed from the polyurethane or polyurethaneurea polymer solution of the present invention through fiber spinning processes such as dry spinning or melt spinning. Polyurethaneureas are typically dry-spun or wet-spun when spandex is desired. In dry spinning, a polymer solution comprising a polymer and solvent is metered through spinneret orifices into a spin chamber to form a filament or filaments. Typically, the polyurethaneurea polymer is dry spun into filaments from the same solvent as was used for the polymerization reactions. Gas is passed through the chamber to evaporate the solvent to solidify the filament(s). Filaments are dry spun at a windup speed of at least 550 meters per minute. The spandex of the present invention is preferably spun at a speed in excess of 800 meters per minute. As used herein, the term "spinning speed" refers to windup speed, which is determined by and is the same as the drive roll speed. Good spinability of spandex filaments is characterized by infrequent filament breaks in the spinning cell and in the wind up. The spandex can be spun as single filaments or can be coalesced by conventional techniques into multi-filament yarns. Each filament is of textile decitex (dtex), in the range of 6 to 25 dtex per filament.

It is well known to those skilled in the art that increasing the spinning speed of a spandex composition will reduce its elongation and raise its load power compared to the same spandex spun at a lower speed. Therefore, it is common practice to slow spinning speeds in order to increase the elongation and reduce the load power of a spandex in order to increase its draftability in circular knitting and other spandex processing operations. However, lowering spinning speed reduces manufacturing productivity.

The following Examples demonstrate the present invention and its capability for use. The invention is capable of other and different embodiments, and its several details are capable of modifications in various apparent respects, without departing from the scope and spirit of the present invention. Accordingly, the Examples are to be regarded as illustrative in nature and not as restrictive.

As used herein and unless otherwise indicated, the term "DMAc" means dimethylacetamide solvent, the term "%NCO" means weight percent of the isocyanate end groups in a capped glycol, the term "MPMD" means 2-methyl-1,5-pentanediamine, the term "EDA" means 1,2-ethylenediamine, and the term "PTMEG" means poly(tetramethylene ether) glycol.

As used herein, the term "capping ratio" is defined as the molar ratio of diisocyanate to glycol, with the basis defined as 1.0 mole of glycol. Therefore, the capping ratio is typically reported as a single number, the moles of diisocyanate per one mole of glycol. For the polyurethaneureas of the present invention, the preferred molar ratio of diisocyanate to poly(tetramethylene-co-ethylene ether) glycol is about 1.2 to about 2.3. For the polyurethanes of the present invention, the preferred molar ratio of diisocyanate to poly(tetramethylerie-co-ethylene ether) glycol is about 2.3 to about 17, preferably about 2.9 to about 5.6.

Materials

THF and PTMEG (TERATHANE® 1800) are available from Invista S. à r. l., Wilmington, Del., USA. NAFION® perfluorinated sulfonic acid resin is available from E.I. DuPont de Nemours and Company, Wilmington, Del., USA.

Analytical Methods

Tenacity is the stress at break in the sixth stretching cycle, or in other words, the resistance of the fiber to breaking at ultimate elongation. Load power is the stress at specified elongations in the first stretching cycle, or in other words, the resistance of the fiber to being stretched to higher elongation. Unload power is the stress at specified elongations in the fifth retraction cycle, or in other words, the retractive force of the fiber at a given elongation after having been cycled to 300 percent elongation five times.

Percent isocyanate—Percent isocyanate (%NCO) of the capped glycols was determined according to the method of S. Siggia, "Quantitative Organic Analysis via Functional Group", 3rd Edition, Wiley & Sons, New York, pages 559-561 (1963) using a potentiometric titration. For the polyurethanes of the present invention Ethyleneether content—The level of ethyleneether content in the poly(tetramethylene-co-ethyleneether) glycols was determined from $^1$H NMR measurements. The sample of poly(tetramethylene-co-ethyleneether) glycol was dissolved in a suitable NMR solvent such as $CDCl_3$ and the $^1$H NMR spectrum obtained. The integral of the combined —$OCH_2$— peaks at 3.7-3.2 ppm was compared to the integral of the combined —C—$CH_2CH_2$—C— peaks from 1.8-1.35 ppm. The —$OCH_2$— peaks come from both EO-based linkages (—O—$CH_2CH_2$—O—) and from THF-based linkages (—O—$CH_2CH_2CH_2CH_2$—O—) while the —C—$CH_2CH_2$—C— linkages come from THF only. To find the molar fraction of ethyleneether linkages in the poly(tetramethylene-co-ethyleneether) glycols, the integral of the —C—$CH_2CH_2$—C— peaks was subtracted from the integral of the combined —$OCH_2$— peaks and then that result was divided by the integral of the —$OCH_2$— peaks.

Number average molecular weight—The number average molecular weight of the poly(tetramethylene-co-ethyleneether) glycol was determined by the hydroxyl number method.

Heat-set efficiency—To measure heat-set efficiency, the yarn samples were mounted on a 10-cm frame and stretched 1.5×. The frame (with sample) was placed horizontally in an oven preheated to 190° C. for 120 seconds. The samples were allowed to relax and the frame to cool to room temperature. The samples (still on the frame and relaxed) were then immersed in a boiling de-mineralized water for 30 minutes. The frame and samples were removed from the bath and allowed to dry. The length of the yarn samples was measured and heat set efficiency (HSE, as a percentage) was calculated according to the following formula:

% $HSE$=(heat set length−original length)/(stretched length−original length)×100

A spandex heat-set efficiency of at least about 85% at 175° C. is needed for use with fabrics containing spandex and cotton or wool. Similar heat-set efficiency can be achieved at 190° C. for use with hard fibers such as nylon.

Strength and Elastic Properties—The strength and elastic properties of the spandex were measured in accordance with the general method of ASTM D 2731-72. An Instron tensile tester was used to determine tensile properties. Three filaments, a 2-inch (5-cm) gauge length and zero-to-300% elongation cycles were used for each of the measurements "as-is" from the windup, that is, without scouring or other treatment, after 24 hours of aging at approximately 70° F. and 65% relative humidity (+/−2%) in a controlled environment. The samples were cycled five times at a constant elongation rate of 50 cm per minute and then held at 300% extension for 30 seconds after the fifth extension. Immediately after the fifth stretch, the stress at 300% elongation was recorded as "G1." After the fiber was held at 300% extension for 30 seconds, the resulting stress was recorded as "G2." The stress relaxation was determined using the following formula:

Stress Relaxation (%)=100×($G1$−$G2$)/$G1$

Stress relaxation is also referred to as stress decay (abbreviated as Dec % in Table V).

Load power, the stress on spandex during initial extension, was measured on the first cycle at 100%, 200%, or 300% extension and is reported in the Tables in grams per denier and designated "LP"; for example, LP200 indicates load power at 200% extension. Unload power, the stress at an extension of 100% or 200% on the fifth unload cycle, is also reported in grams per denier; it is designated as "UP".

Percent elongation at break ("Elo") and tenacity ("ten") were measured on the sixth extension cycle using modified Instron grips to which a rubber tape was attached for reduced slippage.

Percent set—Unless otherwise indicated, percent set was also measured on samples that had been subjected to five 0-300% elongation/relaxation cycles. Percent set ("% SET") was calculated as:

% SET=100($Lf$−$Lo$)/$Lo$ wherein Lo and Lf are the filament (yarn) length, when held straight without tension, before and after the five elongation/relaxation cycles, respectively.

Circular knit (CK) draft—In knitting, the spandex stretches (drafts) when it is delivered from the supply package to the carrier plate and in turn to the knit stitch due to the difference between the stitch use rate and the feed rate from the spandex supply package. The ratio of the hard yarn supply rate (meters/min) to the spandex supply rate is normally 2.5 to 4 times (2.5× to 4×) greater, and is known as the machine draft, "MD." This corresponds to spandex elongation of 150% to 300%, or more. As used herein, the term "hard yarn" refers to relatively inelastic yarn, such as polyester, cotton, nylon, rayon, acetate, or wool.

The total draft of the spandex yarn is a product of the machine draft (MD) and the package draft (PD), which is the amount that the spandex yarn is already stretched on the supply package. For a given denier (or decitex), the spandex content in a fabric is inversely proportional to the total draft; the higher the total draft, the lower the spandex content. PR is a measured property called "Percent Package Relaxation" and is defined as 100*(length of yarn on the package−length of relaxed yarn)/(length of yarn on the package). PR typically measures 5 to 15 for the spandex used in circular knit, elastic, single jersey fabrics. Using the measured PR, package draft (PD) is defined as 1/( 1−PR/100). Therefore, the total draft (TD) may also be calculated as MD/(1−PR/100). A yarn with 4× machine draft and 5% PR would have a total draft of 4.21×, while a yarn with machine draft of 4× and 15% PR would have a total draft of 4.71×.

For economic reasons, circular knitters will often try to use the minimum spandex content consistent with adequate fabric properties and uniformity. As explained above, increasing spandex draft is a way to reduce content. The main factor that limits draft is the percent elongation to break, so a yarn with high percent elongation to break is the most important factor. Other factors, such as tenacity at break, friction, yarn tackiness, denier uniformity, and defects in yarn can reduce the practical achievable draft. Knitters will provide a safety margin for these limiting factors by reducing draft from the ultimate draft (measured percent elongation at break). They typically determine this "sustainable draft" by increasing draft until knitting breaks reach an unacceptable level, such as 5 breaks per 1,000 revolutions of the knitting machine, then backing off until acceptable performance is regained.

Tension in knitting needles can also be a limiting factor for draft. The feed tension in the spandex yarn is directly related to the total draft of the spandex yarn. It is also a function of the inherent modulus (load power) of the spandex yarn. In order to maintain acceptably low tension in knitting at high draft, it is advantageous for the spandex to have a low modulus (load power).

The ideal yarn for high draftability would therefore have high percent elongation to break, low modulus (load power), and adequately high tenacity, low friction and tack, uniform denier, and a low level of defects.

Because of its stress-strain properties, spandex yarn drafts (draws) more as the tension applied to the spandex increases; conversely, the more that the spandex is drafted, the higher the tension in the yarn. A typical spandex yarn path in a circular knitting machine is as follows. The spandex yarn is metered from the supply package, over or through a broken end detector, over one or more change-of-direction rolls, and then to the carrier plate, which guides the spandex to the knitting needles and into the stitch. There is a build-up of tension in the spandex yarn as it passes from the supply package and over each device or roller, due to frictional forces imparted by each device or roller that touches the spandex. The total draft of the spandex at the stitch is therefore related to the sum of the tensions throughout the spandex path.

Residual DMAc in Spandex—The percent DMAc remaining in the spandex samples was determined by using a Duratech DMAc analyzer. A known amount of perclene was used to extract the DMAc out of a known weight of spandex. The amount of DMAc in the perclene was then quantified by measuring the UV absorption of the DMAc and comparing that value to a standardization curve.

Hot-wet creep—Hot-wet creep (HWC) is determined by measuring an original length, $L_0$, of a yarn, stretching it to one-and-a-half times its original length ($1.5L_0$), immersing it in its stretched condition for 30 minutes in a water bath maintained at temperature in the range of 97 to 100° C., removing it from the bath, releasing the tension and allowing the sample to relax at room temperature for a minimum of 60 minutes before measuring the final length, $L_f$. The percent hot-wet creep is calculated from the following formula:

$$\% HWC = 100 \times [(L_f - L_0)/L_0]$$

Fibers with low % HWC provide superior performance in hot-wet finishing operations, such as dyeing.

Intrinsic Viscosity (IV)—Intrinsic viscosity of the polyurethanes and polyurethaneureas was determined by comparing the viscosity of a dilute solution of the polymer in DMAc to that of DMAc itself at 25 *C ("relative viscosity" method) in a standard Cannon-Fenske viscometer tube according to ASTM D2515 and is reported as dl/g.

Washfastness—To determine washfastness, pieces of dyed 100% spandex fabrics were given a standard wash stain test (American Association of Textile Chemists and Colorists Test Method 61-1996, "Colorfastness to Laundering, Home and Commercial: Accelerated"; 2A version), which is intended to simulate five typical home or commercial launderings at low-to-moderate temperatures. The test was run in the presence of multifiber test fabrics containing bands of acetate, cotton, nylon 6,6, polyester, acrylic, and wool fabric, and the degree of staining was visually rated. In the ratings, 1 and 2 are poor, 3 is fair, 4 is good, and 5 is excellent. On this scale, a value of 1 indicates the worst staining and a value of 5 indicates no staining. Color shade change results were also determined using the same scale; 5 means no change and 1 means the greatest change.

The degree of color retention on the spandex fabrics was also determined quantitatively by using a Color-Eye 7000 GretagMacbeth™ colorimeter spectral analyzer using Optiview Quality Control Version 4.0.3 software. Results are reported in CIELAB units. Primary illuminant was $D_{65}$. Color shade change results were determined by comparing the color of the fabric example before washing to the color of the same fabric example after four washes.

EXAMPLES

Random poly(tetramethylene-co-ethyleneether) glycol samples were prepared by contacting a solution of THF, ethylene oxide, and water with Nafion® resin catalyst in a continuous stirred tank reactor held at 57 to 72° C. followed by distilling off the unreacted THF and ethylene oxide, filtering to remove any catalyst fines present, and then distilling off the cyclic ether by-products. A random poly (tetramethylene-co-ethyleneether) glycol with 37 mole percent ethyleneether units and having a number-average molecular weight of 1885 was purchased from Sanyo Chemical Industries.

For each example, the poly(tetramethylene-co-ethyleneether) glycol was contacted with 1-isocyanato-4-[(4-isocyanatophenyl) methyl]benzene to form a capped (isocyanate-terminated) glycol which was then dissolved in DMAc, chain-extended with ethylene diamine, and chain-terminated with diethylamine to form a polyurethaneurea spinning solution. The amount of DMAc used was such that the final spinning solution had 30 to 38 weight percent of polyurethaneurea in it, based on total solution weight. An antioxidant, pigment, and silicone spinning aid were added to all of the compositions. The spinning solution was dry-spun into a column provided with dry nitrogen, the filaments coalesced, passed around a godet roll, and wound at 840 to 1280 m/min. The filaments provided good spinability. All example yarns were 40 denier (44 dtex) and contained four filaments unless otherwise specified. All spandex fiber samples were spun under conditions that dried all of the yarns to about the same residual solvent level.

EXAMPLES 1-15 (high molecular weight ethyleneether-containing spandex)

Random poly(tetramethylene-co-ethyleneether) glycols with the mole percentage of ethyleneether units and number average molecular weights shown in Tables 1-4 were capped with 1-isocyanato-4-[(4-isocyanatophenyl) methyl]benzene at 90° C. for 120 minutes using 100 ppm of a mineral acid as catalyst to give a prepolymer with the molar ratio of diisocyanate to glycol (capping ratio) shown in the Tables. This capped glycol was then diluted with DMAc solvent, chain extended with EDA, and chain terminated with diethylamine to give a spandex polymer solution. The amount of DMAc used was such that the final spinning solution had 30 to 38 weight percent of polyurethaneurea in it, based on total solution weight unless noted otherwise. The spinning solution was dry-spun into a column provided with dry nitrogen, coalesced, passed around a godet roll, and wound up at the speeds listed. Spinning cell temperatures and aspiration gas flow rates were adjusted to result in a residual solvent level of 0.1 to 0.7 percent. The filaments demonstrated good spinability. Fiber properties are presented in the Tables.

COMPARISON EXAMPLES "1-5" (lower molecular weight ethyleneether-containing spandex)

A random poly(tetramethylene-co-ethyleneether) glycol with 37 mole percent ethyleneether units and 1885 number average molecular weight was capped with 1-isocyanato-4-[(4-isocyanatophenyl) methyl]benzene at 90° C. for 120 minutes using 100 ppm of a homogeneous mineral acid as catalyst to give a 2.2% NCO prepolymer. The molar ratio of diisocyanate to glycol was 1.61. This capped glycol was then diluted with DMAc solvent, chain extended with EDA, and chain terminated with diethylamine to give a spandex polymer solution. The amount of DMAc used was such that the final spinning solution had 36 wt % polyurethaneurea in it, based on total solution weight. The spinning solution was dry-spun into a column provided with dry nitrogen, coalesced, passed around a godet roll, and wound up at the listed speeds. The filaments provided good spinability. Fiber properties are presented in Tables 1 and 2.

TABLE 1

| Example | % ethylene-ether | Capping Ratio | Extender | Glycol MW | Filaments per threadline | Spinning Speed (m/min) | PR (%) | CK Machine Draft | Total Draft |
|---|---|---|---|---|---|---|---|---|---|
| 1 | 38 | 1.70 | 100% EDA | 2500 | 4 | 870 | 19.51 | 4.3 | 5.34 |
| 2 | 38 | 1.70 | 100% EDA | 2500 | 4 | 1100 | 20.97 | 4.1 | 5.19 |
| 3 | 38 | 1.70 | 100% EDA | 2500 | 4 | 1280 | 18.66 | 3.7 | 4.55 |
| 4 | 38 | 1.77 | 100% EDA | 2500 | 3 | 844 | 14.05 | 4.1 | 4.77 |
| Comparison Example 1 | 37 | 1.61 | 100% EDA | 1885 | 3 | 844 | 9.8 | 4.0 | 4.44 |
| Comparison Example 2 | 37 | 1.61 | 100%EDA | 1885 | 4 | 1100 | 13.7 | 3.3 | 3.82 |

Examination of the data in Table 1 reveals that as the molecular weight increases from 1885 to 2500 Dalton the spandex of the present invention has higher circular knit total draftability as reflected in the total draft values. The circular knit total drafts of the examples of the invention are higher than those of the Comparison Examples when spun at the same windup speed or at even higher speed.

TABLE 2

| Example | % Ethylene-ether | Glycol MW | Capping Ratio | Extender | Windup Speed (m/min) | LP1 (g/den) | LP2 (g/den) | LP3 (g/den) | ELO (%) | SET (%) |
|---|---|---|---|---|---|---|---|---|---|---|
| Comparison Example 3 | 37 | 1885 | 1.6 | EDA 100% | 870 | 0.0799 | 0.1276 | 0.1740 | 582 | 28.0 |
| 5 | 38 | 2500 | 1.7 | EDA 100% | 870 | 0.0533 | 0.0940 | 0.1417 | 608 | 21.4 |
| Comparison Example 4 | 37 | 1885 | 1.6 | EDA 100% | 1100 | 0.1001 | 0.1450 | 0.1897 | 617 | 31.1 |
| 6 | 38 | 2500 | 1.7 | EDA 100% | 1100 | 0.0703 | 0.1022 | 0.1394 | 739 | 26.3 |
| Comparison Example 5 | 37 | 1885 | 1.6 | EDA 100% | 1280 | 0.1054 | 0.1596 | 0.2240 | 537 | 29.9 |
| 7 | 38 | 2500 | 1.7 | EDA 100% | 1280 | 0.0662 | 0.1118 | 0.1691 | 592 | 22.1 |

Examination of the data in Table 2 reveals that as the molecular weight increases from 1885 to 2500 Dalton the spandex of the present invention has desirable lower load power at 100%, 200%, and 300% elongation at each windup speed. The spandex of the present invention also has desirable higher elongation and lower set at each spinning speed.

TABLE 3

| Example | % Ethylene-ether | Glycol MW | Capping Ratio | Extender | Windup Speed (m/min) | LP1 (g/den) | LP2 (g/den) | LP3 (g/den) | ELO (%) | SET (%) |
|---|---|---|---|---|---|---|---|---|---|---|
| 8 | 50.4 | 2086 | 1.72 | EDA 100% | 872 | 0.0536 | 0.0962 | 0.1458 | 613 | 25.5 |
| 9 | 50.2 | 2890 | 1.97 | EDA 100% | 872 | 0.0452 | 0.0834 | 0.1242 | 683 | 22.1 |
| 10 | 27.2 | 2490 | 1.92 | EDA 100% | 872 | 0.0575 | 0.1173 | 0.1868 | 584 | 22.7 |
| 11 | 26.0 | 2851 | 2.04 | EDA 100% | 872 | 0.0529 | 0.0966 | 0.1469 | 586 | 23.4 |

Examination of the data in Table 3 for Examples 8 and 9, and 10 and 11, pairs of spandex fibers having the same ethyleneether content, shows that as the molecular weight increases, the load power at 100%, 200%, and 300% elongation desirably decreases. The break elongation also increases and set decreases except for Example 11 in which the set is slightly higher. This is likely due to the higher capping ratio, and could be the same or lower since the set measurement error for the sample is approximately +/−2.0.

TABLE 4

| Example | % Ethyleneether | Glycol MW | Capping Ratio | Extender | Windup Speed (m/min) | LP1 (g/den) | LP2 (g/den) | LP3 (g/den) | ELO (%) | SET (%) |
|---|---|---|---|---|---|---|---|---|---|---|
| 12 | 26.6 | 2060 | 1.8 | EDA 100% | 1100 | 0.1136 | 0.1921 | 0.2903 | 432 | 32.2 |
| 13 | 26.0 | 2851 | 2.0 | EDA 100% | 1100 | 0.0615 | 0.1216 | 0.1942 | 488 | 22.8 |
| 14 | 50.3 | 2400 | 1.9 | EDA 100% | 1100 | 0.0653 | 0.1291 | 0.1912 | 598 | 24.9 |
| 15 | 50.2 | 2890 | 2.1 | EDA 100% | 1100 | 0.0623 | 0.1123 | 0.1669 | 615 | 26.3 |

Examination of the data in Table 4 for Examples 12 and 13, and 14 and 15, each pair having the same ethyleneether content but spun at a higher windup speed than the Examples in Table 3, shows that as the molecular weight increases, the load power at 100%, 200%, and 300% elongation desirably decreases. The break elongation also increases and set decreases, except for Example 15 in which the set is slightly higher. This is likely due to the higher capping ratio, and could be the same or lower since the set measurement error for the sample is approximately +/−2.0.

For washfastness testing, fabric samples were produced in the form of circular knit tubing on a Lawson Knitting Unit (Lawson-Hemphill Company), Model "FAK." One feed of 40 denier spandex was knit to form 100% spandex fabric. The Lawson tubing samples were dyed with one acid dye (Nylanthrene blue GLF) and two disperse dyes (Intrasil Red FTS and Terasil Blue GLF) following conventional procedures.

Washfastness results for the spandex fabrics are given in Tables 5, 6, and 7. Color shade change results for the spandex fabrics are given in Table 8. Color readings for the spandex fabrics are given in Table 9.

EXAMPLE 16

A random poly(tetramethylene-co-ethyleneether) glycol with 49 mole percent ethyleneether units and 2045 number average molecular weight was capped with 1-isocyanato4-[(4-isocyanatophenyl)methyl]benzene at 90° C. for 120 minutes using 100 ppm of a mineral acid as catalyst. The molar ratio of diisocyanate to glycol was 1.64. This capped glycol was then diluted with DMAc solvent, chain extended with EDA, and chain terminated with diethylamine to give a spandex polymer solution. The amount of DMAc used was such that the final spinning solution had 38 wt % polyurethaneurea in it, based on total solution weight. The spinning solution was dry-spun into a column provided with 440° C. dry nitrogen, coalesced, passed around a godet roll, and wound up at 869 m/min. The filaments provided good spinability. The spandex had a tenacity of 0.62 g/den and an elongation of 580%.

COMPARISON EXAMPLE 6

A polyurethaneurea polymer was prepared using TERATHANE® 1800. The glycol was capped with 1-isocyanato-4-[(4-isocyanatophenyl)-methyl]benzene at a capping ratio of 1:1.69. The capped glycol was diluted with DMAc and then contacted with a DMAc solution containing a chain extending mixture of EDA and 2-methyl-1,5-pentanediamine (90/10 mole ratio), and diethylamine as a chain terminator, in proportions such that the resulting polymer solution was 35% solids. A 40 denier, 3 filament spandex yarn was spun from the polymer solution at 844 meters per minute. The spandex had a tenacity of 1.11 g/den and an elongation of 470%.

TABLE 5

Washfastness Ratings for Spandex Dyed with 1.5% Nylanthrene Blue GLF

| Example | After This Number of Washes | Acetate | Cotton | Nylon 6,6 | Dacron ® Polyester | Orlon ® Acrylic | Wool |
|---|---|---|---|---|---|---|---|
| 1 | 1 | 4 | 3.5 | 1 | 4.5 | 4.5 | 1 |
| 16 | 1 | 3 | 3.5 | 1 | 4 | 5 | 1.5 |
| Comp. | 1 | 3.5 | 4.5 | 1.5 | 5 | 5 | 2 |
| 1 | 2 | 4 | 3.5 | 1.5 | 5 | 5 | 1 |
| 16 | 2 | 3 | 3.5 | 1.5 | 4.5 | 5 | 1.5 |
| Comp. | 2 | 3.5 | 4.5 | 2 | 5 | 5 | 2.5 |
| 1 | 3 | 4.5 | 4 | 1.5 | 5 | 5 | 2 |
| 16 | 3 | 3.5 | 4 | 1.5 | 5 | 5 | 2 |
| Comp. | 3 | 4 | 4.5 | 2 | 5 | 5 | 2.5 |
| 1 | 4 | 5 | 4.5 | 2 | 5 | 5 | 2.5 |
| 16 | 4 | 4 | 4.5 | 1.5 | 5 | 5 | 2.5 |
| Comp. | 4 | 4 | 4.5 | 2 | 5 | 5 | 2.5 |

TABLE 6

Washfastness Ratings for Spandex Dyed with 1% Intrasil Red FTS

| Example | After This Number of Washes | Acetate | Cotton | Nylon 6,6 | Dacron ® Polyester | Orlon ® Acrylic | Wool |
|---|---|---|---|---|---|---|---|
| 1 | 1 | 2 | 3.5 | 2 | 3.5 | 4.5 | 2 |
| 16 | 1 | 2.5 | 4.5 | 2.5 | 4 | 5 | 2.5 |
| Comp. | 1 | 2.5 | 4 | 2.5 | 4 | 5 | 3 |
| 1 | 2 | 2 | 3.5 | 2 | 3.5 | 4.5 | 2 |
| 16 | 2 | 2.5 | 4.5 | 2.5 | 4 | 5 | 2.5 |
| Comp. | 2 | 2.5 | 4.5 | 2.5 | 4 | 5 | 3 |

TABLE 6-continued

Washfastness Ratings for Spandex Dyed with 1% Intrasil Red FTS

| Example | After This Number of Washes | Acetate | Cotton | Nylon 6,6 | Dacron ® Polyester | Orlon ® Acrylic | Wool |
|---|---|---|---|---|---|---|---|
| 1 | 3 | 2 | 4 | 2 | 3.5 | 4.5 | 2 |
| 16 | 3 | 2.5 | 4.5 | 2.5 | 4 | 5 | 2.5 |
| Comp. | 3 | 2.5 | 4.5 | 2.5 | 4 | 5 | 3 |
| 1 | 4 | 2.5 | 4.5 | 2.5 | 4.5 | 5 | 3 |
| 16 | 4 | 2 | 4 | 2 | 3.5 | 5 | 2 |
| Gomp. | 4 | 2.5 | 4.5 | 2.5 | 4 | 5 | 3 |

TABLE 7

Washfastness Ratings for Spandex Dyed with 1% Terasil Blue GLF

| Example | After This Number of Washes | Acetate | Cotton | Nylon 6,6 | Dacron ® Polyester | Orlon ® Acrylic | Wool |
|---|---|---|---|---|---|---|---|
| 1 | 1 | 4 | 4.5 | 1 | 4.5 | 5 | 1.5 |
| 16 | 1 | 4 | 3 | 1.5 | 5 | 5 | 2.5 |
| Comp. | 1 | 4.5 | 4.5 | 2 | 5 | 5 | 3 |
| 1 | 2 | 4 | 5 | 1 | 5 | 5 | 2 |
| 16 | 2 | 4 | 5 | 2 | 5 | 5 | 2.5 |
| Comp. | 2 | 4.5 | 4.5 | 2 | 5 | 5 | 3 |

TABLE 7-continued

Washfastness Ratings for Spandex Dyed with 1% Terasil Blue GLF

| Example | After This Number of Washes | Acetate | Cotton | Nylon 6,6 | Dacron ® Polyester | Orlon ® Acrylic | Wool |
|---|---|---|---|---|---|---|---|
| 1 | 3 | 4 | 5 | 1.5 | 5 | 5 | 2 |
| 16 | 3 | 4.5 | 5 | 2 | 5 | 5 | 2.5 |
| Comp. | 3 | 4 | 5 | 3 | 5 | 5 | 3 |
| 1 | 4 | 4.5 | 5 | 2 | 5 | 5 | 2.5 |
| 16 | 4 | 4.5 | 5 | 2.5 | 5 | 5 | 2.5 |
| Comp. | 4 | 4 | 5 | 3 | 5 | 5 | 3 |

TABLE 8

Shade Change Results After Four Washes

| Example | Dye | Shade Change |
|---|---|---|
| 1 | Nylanthrene Blue GLF | 2 |
| 16 | Nylanthrene Blue GLF | 3 |
| Comp. Ex. 6 | Nylanthrene Blue GLF | 1 |
| 1 | Intrasil Red FTS | 3 |
| 16 | Intrasil Red FTS | 4 |
| Comp. Ex. 6 | Intrasil Red FTS | 3.0–4 |
| 1 | Terasil Blue GLF | 3 |
| 16 | Terasil Blue GLF | 2.0–3 |
| Comp. Ex. 6 | Terasil Blue GLF | 2 |

TABLE 9

Color Readings on Spandex Fabrics by Colorimeter Method

| Example | After Wash # | Dye | L | A | B | DE | K/S at max | Chromatic | Apparent |
|---|---|---|---|---|---|---|---|---|---|
| Comp. Ex. 6 | 0 | Nylanthrene Blue GLF | 36.25 | −2.29 | −32.56 | | 10.76 | | |
| Comp. Ex. 6 | 4 | Nylanthrene Blue GLF | 58.7 | −8.48 | −14.06 | 29.74 | 1.66 | 15.43 | 18.91 |
| 1 | 0 | Nylanthrene Blue GLF | 36.2 | −1.6 | −32.59 | | 10.48 | | |
| 1 | 4 | Nylanthrene Blue GLF | 48.32 | −7.42 | −26.54 | 14.75 | 4.23 | 40.42 | 41.48 |
| 16 | 0 | Nylanthrene Blue GLF | 39.98 | −4.11 | −28.62 | | 7.49 | | |
| 16 | 4 | Nylanthrene Blue GLF | 44.74 | −6.23 | −28.01 | 5.25 | 5.5 | 73.42 | 72.83 |
| Comp. Ex. 6 | 0 | Terasil Blue GLF | 34.9 | −8.99 | −20.47 | | 10.23 | | |
| Comp. Ex. 6 | 4 | Terasil Blue GLF | 43.55 | −12.68 | −17.54 | 9.85 | 5.97 | 57.7 | 58.03 |
| 1 | 0 | Terasil Blue GLF | 33.69 | −7.08 | −22.25 | | 10.95 | | |
| 1 | 4 | Terasil Blue GLF | 37.23 | −10.62 | −21.4 | 5.07 | 9.59 | 87.18 | 84.22 |
| 16 | 0 | Terasil Blue GLF | 37.23 | −8.08 | −22.53 | | 8.77 | | |
| 16 | 4 | Terasil Blue GLF | 39.1 | −11.79 | −20.09 | 4.83 | 8.64 | 96.45 | 94.69 |
| Comp. Ex. 6 | 0 | Intrasil Red FTS | 34.29 | 45.05 | 11.99 | | 17.74 | | |
| Comp. Ex. 6 | 4 | Intrasil Red FTS | 33.33 | 39.02 | 9.94 | 6.47 | 15.6 | 87.93 | 91.74 |
| 1 | 0 | Intrasil Red FTS | 33.54 | 40.44 | 11.77 | | 16.05 | | |
| 1 | 4 | Intrasil Red FTS | 38.02 | 39.67 | 8.03 | 5.89 | 11.14 | 69.42 | 65.19 |
| 16 | 0 | Intrasil Red FTS | 34.17 | 45.39 | 10.08 | | 16.84 | | |
| 16 | 4 | Intrasil Red FTS | 34.07 | 43.11 | 10.85 | 2.4 | 16.08 | 95.49 | 97.08 |

The results show that, for the spandex fabrics dyed with the acid dye (Nylanthrene Blue GLF), after one wash fabric comprising spandex of Example 1 gave mixed results when compared to the poly(tetramethylene ether) glycol-based spandex fabric of Comparison Example 6, some washfastness results were worse than Comparison Example 6, some were better, and some were the same. However, after one wash fabric comprising spandex of Example 16 [spandex comprising poly(tetramethylene-co-ethyleneether) glycol having 49 mole percent ethyleneether units] showed washfastness results equal to or better than Comparison Example 6, except in the case of the acetate test strip. After four washes, fabric comprising spandex of Example 1 [spandex comprising poly(tetramethylene-co-ethyleneether) glycol having 38 mole percent ethyleneether units] gave the same results as Comparison Example 6 except for the acetate and nylon test strips. Fabric comprising spandex of Example 16, with the exception of the acetate test strip, gave the same performance as Comparison Example 6 spandex fabric.

The results show that, for the spandex fabrics dyed with disperse dye Intrasil Red, after one wash both poly(tetramethylene-co-ethyleneether) glycol-based fabrics showed better performance in all cases when compared to poly(tetramethylene ether) glycol-based Comparison Example 6. After four washes, the fabric of Example 16 gave the same results as Comparison Example 6, except in the case of the polyester test strip, where Comparison Example 6 showed slightly less staining. After four washes, the fabric of Example 1 showed the same results as Comparison Example 6 (and Example 16) in the case of the acrylic test strip, but in the other cases gave poorer performance than Comparison Example 6 (and Example 16).

The results show that, for the spandex fabrics dyed with disperse dye Terasil Blue, after one wash the fabric of Example 16 gave the same or better results than Comparison Example 6. After one wash, the fabric of Example 1 also gave the same or better results than Comparison Example 6, except in the case of the cotton test strip. After four washes, with the exception of the acetate test strip, the fabric of Example 16 gave the same (in the case of the cotton, polyester, and acrylic) or better (in the case of nylon and wool) results as did Comparison Example 6. After four washes, the fabric of Example 1 also gave the same (in the case of acetate, cotton, polyester, acrylic, and wool) or better (in the case of nylon) results as did Comparison Example 6.

The shade change results after four washes show that with the disperse dyes, the Examples display the same or less shade change (i.e., a higher value) than Comparison Example 6.

EXAMPLES 17-21

A random poly(tetramethylene-co-ethyleneether) glycol with 49 mole percent ethyleneether units and 2443 number average molecular weight was capped with 1-isocyanato-4-[(4-isocyanatophenyl)methyl]benzene at 90° C. for 120 minutes using 100 ppm of a homogeneous mineral acid as catalyst to give a 3.5% NCO prepolymer. The molar ratio of diisocyanate to glycol was 2.26. This capped glycol was then diluted with DMAc solvent, and chain extended with BDO (1,4-butanediol), to give a spandex polymer solution. It is also possible and common in spandex technology to add a chain terminator in the formulation to control the molecular weight and other properties. Chain terminators are not as much a necessity for polyurethane formulations in that polyurethanes tend to be more soluble and have fewer propensities for the hard segments to associate increasing the apparent molecular weight of the polymer. This above general procedure was modified and used to generate Examples 18, 19, 20 and 21. The amount of DMAc used was such that the final spinning solution had 35 wt % polyurethane in it, based on total solution weight. The spinning solution was dry-spun into a column provided with dry nitrogen, the filaments were coalesced, passed around a godet roll, and wound up at the listed speeds. The filaments provided good spinability. Spinning speed was 870 meters per minute. Fiber properties of Example 17 are presented in Table 10. Additional properties of Examples 17 through 21 are presented in Table 11.

TABLE 10

| Example | % ethyleneether in glycol | Extender | Glycol MW | % NCO | LP1 (g/den) | LP2 (g/den) | LP3 (g/den) | ELO % | SET % | TEN (g/den) | UP1 | UP2 |
|---|---|---|---|---|---|---|---|---|---|---|---|---|
| 17 | 49 | 100% BD | 2443 | 3.5 | .0185 | .0342 | .0590 | 626 | 41 | .3218 | .0067 | .0195 |

Example 17 was spun from DMAc solvent at 35% polymer solids.
BDO is 1,4-butanediol Polyurethane films were cast according to the following procedures:

Solution Cast Films—Polymer solution was placed on Mylar® film which had been fixed to a flat surface, and a 0.005 to 0.015 inch film was cast with a film knife. The Mylar® film which was coated with the polyurethane film was then removed from the flat surface and placed in a film drying box, where it was dried under nitrogen flow at 20 to 25° C. for a minimum of 16 to 18 hours.

Melt Compression Films—The polyurethane polymer was obtained from the polyurethane solution by evaporating the DMAc solvent away from the polymer under heat and a nitrogen flow. The solid polyurethane polymer was then placed in between two Mylar® sheets. The Mylar® sheets with the polyurethane in between were place between two heated platens in a Carver® Hydraulic Press. The platens were heated to 350° C. +/−25° C. in one experiment and to 250° C. +/−25° C. in another. The platens were brought together using the hydraulic press until the platens exerted a force on one another of 5000 pounds per square inch. The force/pressure quickly dropped to 2000 pounds per square inch as the polyurethane melted. After about 30 seconds the pressure was released and the Mylar® sheets removed from between the platens and allowed to cool to room temperature. The Mylar® sheets were removed leaving a thin clear polyurethane film of thickness 0.64 mm.

TABLE 11

| Example | % ethyleneether in glycol | Extender | Glycol MW | % NCO | Intrinsic Viscosity (dl/g) | Film Formation | Solids (%) |
|---|---|---|---|---|---|---|---|
| 17 | 49 | 100% BDO | 2443 | 3.5 | — | Melt compression - Clear, good stretch and recovery, good tear strength, tacky | 35.2 |
| 18 | 49 | 100% EG | 2443 | 3.5 | To low to measure | Solution Cast - clear, good stretch and recovery, poor tear strength, tacky | 42.6 |
| 19 | 49 | 100% BDO | 2443 | 3.5 | 1.2 | Solution Cast - Clear, good stretch and recovery, good tear strength, not tacky | 37.6 |
| 20 | 49 | 100% EG | 2443 | 10 | 0.29 | Solution Cast - white opaque, no stretch, very poor tear strength, not tacky, waxy feel | 38.7 |
| 21 | 49 | 100% BDO | 2443 | 10 | 0.51 | Solution cast - slightly opaque, good stretch and recovery, good tear strength, not tacky, | 37.7 |

Examples 17 and 19 are the same formulation. Example 17 is a scaled up version of Example 19 used for solution spinning.
BDO is 1,4-butanediol
EG is 1,2-ethylene glycol Many modifications and other embodiments of the inventions set forth herein will come to mind to one skilled in the art to which these inventions pertain having the benefit of the teachings presented in the foregoing descriptions. Therefore, it is to be understood that the inventions are not to be limited to the specific embodiments disclosed and that modifications and other embodiments are intended to be included within the scope of the appended claims.

What is claimed is:

1. Spandex comprising a polyurethaneurea comprising the reaction product of:
   (a) a poly(tetramethylene-co-ethyleneether) glycol comprising constituent units derived by copolymerizing tetrahydrofuran and ethylene oxide wherein the portion of the units derived from ethylene oxide is present in the poly(tetramethylene-co-ethyleneether) glycol from about 48 mole percent to about 70 mole percent and the number average molecular weight of said glycol is from 1900 Dalton to about 4000 Dalton;
   (b) at least one diisocyanate, said diisocyanate present in a molar ratio of diisocyanate to poly(tetramethylene-co-ethyleneether) glycol of about 1.2:1 to about 2.3:1; and
   (c) at least one diamine chain extender selected from the group consisting of ethylene diamine, 1,3-butanediamine, 1,4-butanediamine, 1,3-diamino-2,2-dimethylbutane, 1,6-hexanediamine, 1,2-propanediamine, 1,3-propanediamine, N-methylaminobis(3-propylamine), 2-methyl-1,5-pentanediamine, 1,5-diatninopentane, 1,4-cyclohexanediamine, 1,3-diamino-4-methylcyclohexane, 1,3-cyclohexane-diamine, 1,1-methylene-bis(4,4'-diaminohexane), 3-aminomethyl-3,5,5-trimethylcyclohexane, 1,3-diaminopentane, m-xylylene diamine, hydrazine, and mixtures thereof, said diamine chain extender having between 0 and about 20 mole percent co-extenders; and at least one chain terminator.

2. The spandex comprising the polyurethaneurea reaction product of claim 1 wherein the portion of the units derived from ethylene oxide is present in the poly(tetramethylene-co-ethyleneether) glycol from about 48 mole percent to about 58 mole percent.

3. The spandex comprising the polyurethaneurea reaction product of claim 1 wherein said poly(tetramethylene-co-ethyleneether) glycol has a molecular weight from 1900 Dalton to about 3000 Dalton.

4. The spandex of claim 1 wherein the diisocyanate is selected from the group consisting of 1-isocyanato-4-[(4-isocyanato-phenyl)methyl]benzene, 1-isocyanato-2-[(4-isocyanato-phenyl)methyl]benzene, and mixtures thereof.

5. The spandex of claim 1 having a load power at 300% elongation between about 0.11 and about 0.24 grams per denier on the first elongation cycle.

6. The spandex of claim 1 having an unload power at 200% elongation between about 0.027 and about 0.043 grams per denier on the fifth elongation cycle.

7. The spandex of claim 1 having a load power at 200% elongation between about 0.075 and about 0.165 grams per denier on the first elongation cycle.

8. The spandex of claim 5 wherein the spandex is spun at a speed in excess of about 800 meters per minute.

9. The spandex of claim 6 wherein the spandex is spun at a speed in excess of about 800 meters per minute.

10. The spandex of claim 7 wherein the spandex is spun at a speed in excess of about 800 meters per minute.

11. A fabric comprising the spandex of claim 1.

12. A garment or textile article comprising the fabric of claim 11.

13. Spandex comprising a polyurethaneurea comprising the reaction product of:
   (a) a poly(tetramethylene-co-ethyleneether) glycol comprising constituent units derived by copolymerizing tetrahydrofuran and ethylene oxide wherein the portion of the units derived from ethylene oxide is present in the poly(tetramethylene-co-ethyleneether) glycol from about 48 mole percent to about 70 mole percent and the number average molecular weight of said glycol is from 1900 Dalton to about 4000 Dalton;
   (b) at least one diisocyanate, said diisocyanate present in a molar ratio of diisocyanate to poly(tetramethylene-co-ethyleneether) glycol of about 1.2:1 to about 2.3:1; and
   (c) ethylene diamine as chain extender having between about 0 and about 20 mole percent co-extenders; and at least one chain terminator.

14. A fabric comprising the spandex of claim 13.

15. A garment or textile article comprising the fabric of claim 14.

16. Spandex comprising a polyurethane comprising a reaction product of:
(a) a poly(tetramethylene-co-ethyleneether) glycol comprising constituent units derived by copolymerizing tetrahydrofuran and ethylene oxide wherein the portion of the units derived from ethylene oxide is present in the poly(tetramethylene-co-ethyleneether) glycol from about 48 mole percent to about 70 mole percent and the number average molecular weight of said glycol is from 1900 Dalton to about 4000 Dalton;
(b) at least one diisocyanate present in a molar ratio of diisocyanate to poly(tetramethylene-co-ethyleneether) glycol of about 2.3:1 to about 17:1; and
(c) at least one diol chain extender having between about 0 and about 20 mole percent co-extenders; and
at least one chain terminator.

17. A fabric comprising the spandex of claim 16.

18. A garment or textile article comprising the fabric of claim 17.

19. A process for preparing spandex comprising:
(a) contacting a poly(tetramethylene-co-ethyleneether) glycol comprising constituent units derived by copolymerizing tetrahydrofuran and ethylene oxide wherein the portion of the units derived from ethylene oxide is present in the poly(tetramethylene-co-ethyleneether) glycol from about 48 mole percent to about 70 mole percent and the number average molecular weight of said glycol is from 1900 Dalton to about 4000 Dalton with at least one diisocyanate to form a capped glycol;
(b) optionally adding a solvent to the product of (a);
(c) contacting the product of (b) with at least one diamine or diol chain extender, said diamine or diol chain extender having between 0 and 20 mole percent co-extenders; and
(d) spinning the product of (c) to form spandex;
wherein, if a diamine is used in step (c), said diisocyanate is present in a molar ratio of diisocyanate to poly(tetramethylene-co-ethyleneether) glycol of about 1.2:1 to about 2.3:1 and if a diol is used in step (c), said diisocyanate is present in a molar ratio of diisocyanate to poly(tetramethylene-co-ethyleneether) glycol of about 2.3:1 to about 17:1.

20. The process of claim 19 wherein the diisocyanate is selected from the group consisting of 1-isocyanato-4-[(4-isocyanato-phenyl)methyl]benzene, 1-isocyanato-2-[(4-isocyanato-phenyl)methyl]benzene, and mixtures thereof and wherein the molar ratio of diisocyanate to poly(tetramethylene-co-ethyleneether) glycol is about 1.2:1 to about 2.3:1.

21. The process of claim 19 wherein the at least one diamine chain extender is ethylene diamine having between 0 and 20 mole percent co-extenders.

22. The process of claim 19 wherein the spinning to form spandex is dry-spinning and the poly(tetramethylene-co-ethyleneether) glycol has a molecular weight from 1900 Dalton to about 3000 Dalton.

* * * * *